United States Patent [19]

Bailen

[11] 4,312,022
[45] Jan. 19, 1982

[54] SHOCK HAZARD PROTECTIVE APPARATUS FOR HIGH VOLTAGE SYSTEM

[75] Inventor: Eddie H. Bailen, Omaha, Nebr.
[73] Assignee: Omeco-St. John Co., Omaha, Nebr.
[21] Appl. No.: 92,223
[22] Filed: Nov. 7, 1979
[51] Int. Cl.³ .............................................. H02H 3/33
[52] U.S. Cl. ........................................ 361/46; 361/42
[58] Field of Search ...................... 361/44, 45, 46, 42, 361/47, 48, 49, 50

[56] References Cited

U.S. PATENT DOCUMENTS

| | | | |
|---|---|---|---|
| 4,044,395 | 8/1977 | Eckart | 361/44 |
| 4,156,884 | 5/1979 | Eckart et al. | 361/46 |
| 4,159,501 | 6/1979 | White | 361/42 X |
| 4,233,639 | 11/1980 | Klein et al. | 361/44 |
| 4,233,640 | 11/1980 | Klein et al. | 361/44 |

Primary Examiner—Patrick R. Salce
Attorney, Agent, or Firm—Darbo & Vandenburgh

[57] ABSTRACT

Protection against a high voltage apparatus becoming inadvertently grounded and thereby presenting a shock hazard is provided by introducing a ground fault interrupter in the power supply to the electrical control device which controls the supply of high voltage power. The two-wire power supply line between the ground fault interrupter and the control device has one wire grounded ahead of the interrupter and the other wire connected to the high voltage apparatus through a rectifier and a D.C. filter. Thus if the high voltage apparatus becomes accidentally grounded there is a drain to ground from the ground fault interrupter through the rectifier connection, which drain causes the interrupter to cut off the power supply to the control device thereby shutting down the high voltage apparatus.

8 Claims, 1 Drawing Figure

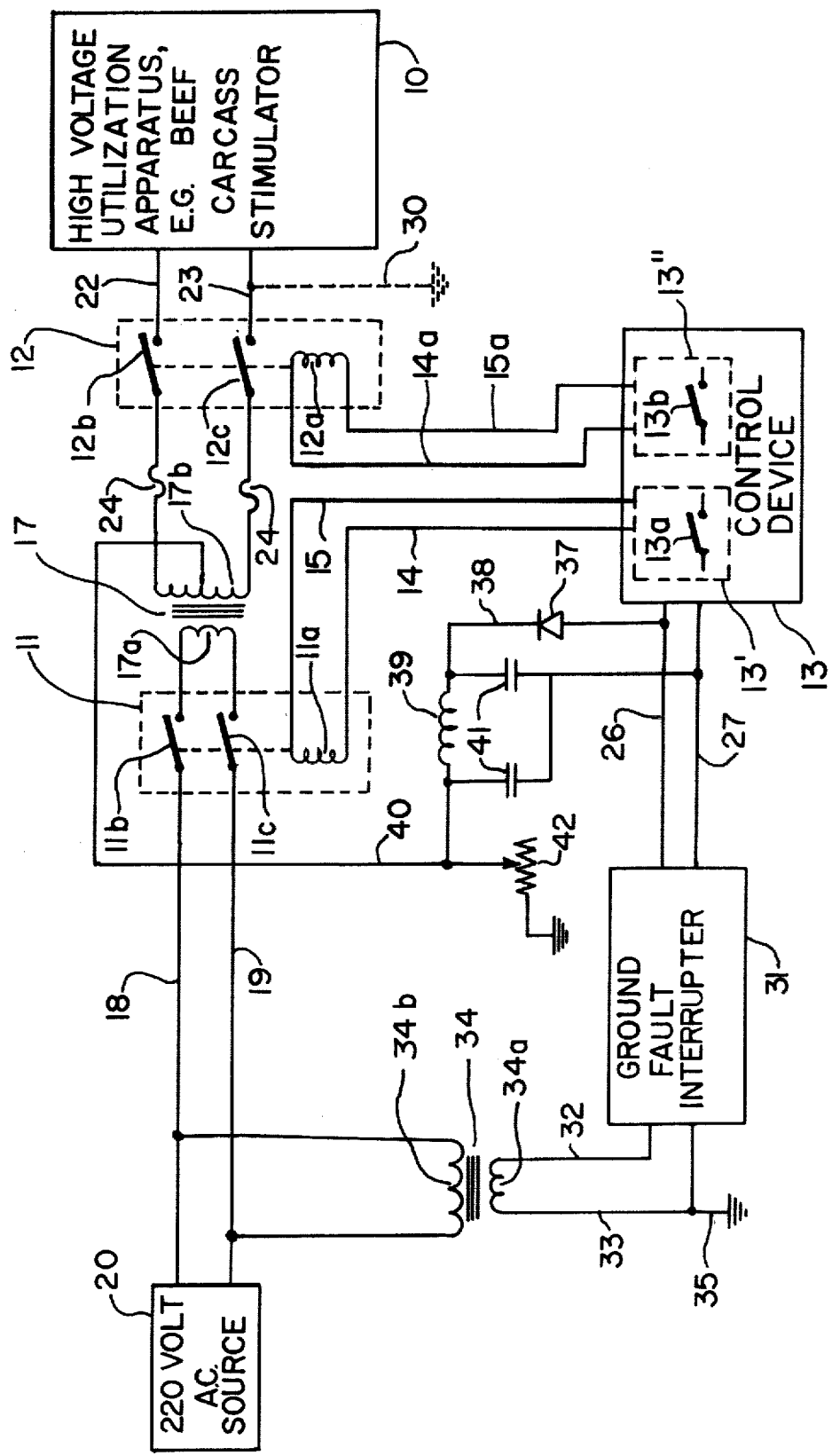

SHOCK HAZARD PROTECTIVE APPARATUS FOR HIGH VOLTAGE SYSTEM

BACKGROUND AND SUMMARY OF THE INVENTION

In the process of slaughtering animals for food, considerable interest has developed in the electrical stimulation of the freshly slaughtered carcasses. It has been shown that this electrical stimulation produces a number of advantageous effects, including an improved tenderization of the carcass meat, a brighter more youthful lean color of the meat and less "heat-ring" formation. This electrical stimulation has been discussed in a number of publications; see "The National Provisioner" for June 4, 1977, page 11 et seq., "Meat Industry" for April, 1977, pages 32 and 77 and "Meat Industry" for July, 1978, page 38 et seq. The electrical stimulation is achieved by applying a plurality of pulses of a relatively high voltage electric current through the carcass. The voltages employed may be in the range of 550 volts and upward.

In commercial operations such an electrical stimulation process presents potential shock hazards to employees. Because of the voltages involved, an employee can potentially receive a shock which will cause severe injury if not death. The electrical systems employed are ungrounded, but as the apparatus is employed in a meat packing house there is a potential for the high voltage electrical system to become accidentlly grounded and as a result a worker, who necessarily also is grounded, can receive an electric shock from the system. It is likely that high humidity conditions exist in the packing plant and this may result in an accidental grounding. Of course, various other possibilities exist for an accidental grounding of the system.

The principal object of the present invention is to detect the existence of any such unintentional and accidental grounding and to shut down the system in the event that it occurs.

Ground fault interrupters are known and are commonly used in electrical systems for the protection against shock hazards. They are necessarily employed with systems in which one side of the electrical power is intentionally grounded. Their purpose is to shut off the flow of electrical power in the event that a person's body completes a circuit between the other side of the electrical power and ground, the shutting off of the power being conducted with such rapidity that the person will not be injured. The fact that they necessarily are employed with a grounded system prevents their use in a totally ungrounded system, such as that of an electric carcass stimulator. Furthermore they have an inherent problem in that if the wires carrying the electric power out from the ground fault interrupter are of significant length, and thus present significant capacitance, there will be a power loss which will cause a false or unintended tripping of the interrupter.

I have devised a method and apparatus for utilizing a ground fault interrupter to detect an accidental and inadvertent grounding of a normally ungrounded high voltage system, with the power into the system being shut off upon such grounding being detected. With one side of the input of the interrupter being grounded, I connect the other side of the output of the interrupter to the high voltage system through a rectifier and, generally, a smoothing filter so that only direct current can flow from the interrupter through the high voltage system to any accidental ground that may occur. When an accidental ground does occur, the interrupter sees more current flowing out than is returning (because of the direct current flow to ground) and, as in the normal functioning of such an interrupter, that condition causes the interrupter to open the circuit. Having made that detection of the accidental grounding, I then use the circuit-opening characteristic of the interrupter to open a switch in the high voltage system thereby removing the high voltage from that system. As in the subsequently described embodiment, this can be accomplished by having a normally open switch in the high voltage system, which switch can be closed only when electrical power is present at the output of the interrupter.

In the present invention, the sensitivity of the detection is adjustable by employing a variable resistor between the high voltage system and ground. This resistor functions to drain some direct current from the system to ground. Of course, if too much direct current is drained to ground through the resistor this will cause the interrupter to open its electrical circuit. But by setting the amount of drain to a value somewhat less than that required to trip the interrupter, the detection system can be made quite sensitive or, if desired, somewhat less sensitive.

Other objects and advantages will be apparent from the following description.

DESCRIPTION OF THE DRAWING

The drawing is a schematic illustration of an embodiment of the invention utilized in connection with a high voltage beef carcass stimulator.

DESCRIPTION OF SPECIFIC EMBODIMENT

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

For the purpose of illustrating the use of the present invention, it is described in connection with a beef carcass stimulator (high voltage utilization apparatus) 10 employed to apply periodic pulses of high voltage electrical energy to beef carcasses, or parts thereof, for tenderization purposes. However, the invention could be used with other ungrounded, high voltage utilization apparatus. The periodic pulses are achieved by the switches of a pair of relays 11 and 12 which are opened and closed periodically as dictated by timers and control relays (not shown) incorporated in an electrical control device 13.

The high voltage required for the utilization apparatus 10 is achieved by means of a step-up transformer 17 having a primary winding 17a and a secondary winding 17b. The relay contacts serving as switches 11b and 11c are connected in series with the primary winding 17a and respectively in the wires 18 and 19 leading from an alternating current source 20 to the primary winding 17a. Similarly the relay contacts serving as switches 12b and 12c are respectively connected in wires 22 and 23 leading from the secondary to a high voltage utilization apparatus 10. Fuses 24 also are incorporated in this circuit. This high voltage circuit normally is ungrounded.

The control devices 13 are supplied with electrical power (e.g. 110 volts AC) through supply wires 26 and 27. Control device 13 includes two sections 13' and 13", respectively controlling the primary and secondary circuits of a high voltage transformer 17. Section 13' controls the length of time, or period, during which a carcass is stimulated, while section 13" controls the pulsing of the high voltage current during that period. When the period is to commence, wires 14 and 15 are energized from the control device (assuming that the power supply wires 26 and 27 are energized) to thereby energize relay coil 11a whereupon the normally open contacts 11b and 11c, acting as switches, are closed. Thereupon the primary 17a of transformer 17 is energized from source 20. During the period the timer associated with section 13" periodically causes wires 14a and 15a to be briefly energized from the control device (assuming that the power supply wires 26 and 27 are energized). When so energized wires 14a and 15a in turn cause relay coil 12a to be energized. This causes relay contacts 12b and 12c, acting as switches, to close and connect the high voltage secondary 17b of the transformer with the carcass stimulator 10. The various control switches, whatever they may be, (including relay and timer contacts) of the control device are simulated in the drawing by switches 13a and 13b.

As thus far described, a circuit and components are conventional. But as previously described, there is a potential danger to workers utilizing the apparatus 10 in that should a portion of the apparatus become inadvertently grounded, as represented by the dot-dash ground connection 30, an accident could occur in which a worker would be seriously injured, if not killed, by the escape of electrical power from the utilization apparatus 10 or the high voltage wiring leading thereto. The purpose of the present invention is to prevent this from occurring and to shut off the supply of high voltage power in the event that an inadvertent ground connection 30 takes place.

For this purpose I use a ground fault interrupter 31 in the power supply for the control device 13 thus the wires 26 and 27 are connected to the output of the ground fault interrupter and the input of the ground fault interrupter is connected by wires 32 and 33 to the secondary 34a of a stepdown transformer 34. The primary 34b of this transformer is connected to wires 18 and 19. The secondary of the transformer produces 110/120 volt alternating current (as required by control device 13). Wire 33 is grounded as indicated by connection 35. This has the effect of also grounding wire 27 since both it and wire 33 are at the same potential through interrupter 31, but the ground connection 35 should be ahead of the interrupter, as shown. If the normal domestic power (e.g. 110/120 volt) supply is used from an electrical outlet, one side of that power supply already is grounded. Wire 33 would then represent that side of the power supply and a special ground connection would not be required.

Ground fault interrupters are off the shelf items and are made by various manufacturers. For example an interrupter that could be used in the disclosed embodiment would be model THQ 1115GF manufactured by General Electric. They are commonly used to protect against shock hazard. For example, should wire 26, or something connected to it become inadvertently connected, as through a person's body, to ground the interrupter 31 would stop the flow of electrical current in wires 26, 27 substantially instantaneously and so fast that no injury would occur to the person. Thus, in the conventional sense, an interrupter 31 might be used in the power supply to the control devices 13 to protect against shock hazard in that control device. But were the short 30 to occur this would not, in the conventional sense, effect the operation of the control device 13 and thus not cause the interrupter to stop the flow of current to the control device.

The commercially available ground fault interrupters are subject to the problem that if the ouput wires (e.g. 26, 27) are very long there is a capacitance effect that can result in false tripping of the interrupter. This plus other factors makes it impractical to insert such an interrupter in the high voltage circuit to apparatus 10.

To trip the interrupter 31 in the event of occurrence of the inadvertent connection 30, I connect wire 26 through a rectifier 37, choke 39 and wire 40 to a tap on the transformer secondary 17b. Choke 39 is a part of direct current filter which also includes capacitors 41 connected to wire 27 which represents the circuit ground. A variable resistor 42 is connected between wire 40 and ground.

In the event that an inadvertent ground connection 30 occurs there is a flow of current through the rectifier and choke to ground. This dissipation of power from the output of the ground fault interrupter 31 without return current is sensed by the interrupter causing the interrupter to immediately disconnect its output from its input. This results in no power being supplied to the control device 13 so that it fails to function and contacts 11b, 11c, 12b and 12c remain open. This tells the operators that a malfunction has occurred. Their inspection will reveal the existence of the inadvertent ground 30. When the ground connection is removed, the apparatus can be put back into operation, with interrupter 31 then being reset to supply power to the control device 13. It should be understood that all the ground symbols shown in the drawing represent earth ground.

Resistor 42 is a sensitivity control. It provides a bleed-off to ground of some of the power from wire 26. If the setting is such that too much bleed-off occurs, this could cause the interrupter to shut off the power as just described. The resistor of course would be set below this level so that interrupter 31 would remain unaffected. It could however be set such that only a very minor ground connection 30, not capable of carrying much power, would be sufficient (along with the bleed-off in resistor 42) to cause the interrupter 31 to trip.

The direct current filter 39, 41 serves as a smoothing filter to transform the pulsating D.C. achieved by the action of rectifier 37 on the A.C. of wires 26, 27 to be a substantially continuous D.C. This is done for the reason that a pulsating D.C. would react in an inductor (i.e. transformer secondary 17b) much as would an alternating current.

Were the ground 30 to occur on wire 22, rather than wire 23 as illustrated, the operation would be the same. Since direct current is used in the circuit 37, 38, etc., it makes no difference where the wire 40 connects into the high voltage circuit, since the direct current resistance of the high voltage circuit, including secondary 17b, is very low. Thus, from the standpoint of operating interrupter 31, the wire 40 could connect, for example, at one end of secondary 17b rather than in the center as illustrated.

As an example of specific components, the rectifier 37 could be a 2.5 ampere silicon diode, rated at 1,000 volts. The choke 39 could be a 100 microhenry and the capacitors 41 could each be 1 microfarad, rated at 600 volts. The resistor 42 could be 250 K ohms rated at 2 watts.

Since a beef carcass stimulator already incorporates a control device 13 with the switches of relays 11 and 12, the ground fault interrupter could be employed in conjunction therewith. But if a particular high voltage utilization apparatus did not already have such a control device, it would be necessary to add its equivalent thereto; that is, add a normally open switch to the high voltage circuit and means for controlling that switch which would permit the switch to be closed only when electrical power was present at the output of the interrupter.

I claim:

1. A method of using an alternating current ground fault interrupter, which has an input and an output both of which have two sides, to provide shock hazard protection to an electrical apparatus connected by circuit means including a high voltage line to an ungrounded alternating current source of electrical power, said apparatus including a control device which when alternating current of a lower voltage is not supplied thereto from a source of said lower voltage will cause said apparatus to be disconnected from said high voltage source, said method comprising the steps of:
   connecting the ground fault interrupter between said lower voltage source, one side of which is grounded, and said control device with said output being connected to said device and with one side of said output electrically corresponding to said grounded side of said low voltage source; and
   making a connection capable of only unidirectional current flow between the second side of said output and said circuit means;
   whereby if some portion of said apparatus accidentally becomes grounded and therefore the electrical apparatus presents a shock hazard, said grounding provides a drain to ground from the output of the interrupter through said last mentioned connection and thereby causes said interrupter to disconnect said device from said low voltage source.

2. A method as set forth in claim 1 including the step of bleeding a small amount of direct current from said circuit means to ground for increasing the sensitivity of said interrupter to said accidental grounding.

3. A protective apparatus for providing shock hazard protection to an ungrounded electrical apparatus connected by circuit means including a high voltage line to an alternating current source of electrical power, said electrical apparatus including a control device which when alternating current of a lower voltage is supplied thereto from a source of said lower voltage will cause said electrical apparatus to be disconnected from said high voltage source, said apparatus comprising:
   a ground fault interrupter having an input and an output;
   means including two wires connecting said input to said lower voltage source, one of said wires being connected to ground;
   means including two wires connecting said output to said control device for supplying power to said device through said interrupter from said lower voltage source, one of the last mentioned wires being connected through the interrupter to the first mentioned one wire; and
   means including a rectifier connecting the other of the last mentioned two wires to said circuit means;
   whereby if some portion of said electrical apparatus accidentally becomes grounded and therefore the electrical apparatus presents a shock hazard, said grounding provides a drain to ground from the interrupter through said last mentioned connection and thereby causes said interrupter to disconnect said device from said low voltage source.

4. A protective apparatus as set forth in claim 3, wherein the last mentioned means includes a smoothing filter.

5. A protective appartus as set forth in claim 4, including an adjustable resistor between said circuit means and ground for bleeding a small amount of direct current from said circuit means to ground for increasing the sensitivity of said interrupter to said accidental grounding.

6. A protective apparatus as set forth in claim 3 and wherein said circuit means includes a transformer having a secondary connected to said electrical apparatus for supplying said high voltage thereto, the further improvement comprising:
   said transformer having a secondary tap; and
   the connection between the means which includes a rectifier and said circuit means being at said tap.

7. A protective apparatus as set forth in claim 3, including an adjustable resistor between said circuit means and ground for bleeding a small amount of direct current from said circuit means to ground for increasing the sensitivity of said interrupter to said accidental grounding.

8. A protective apparatus for providing protection in an ungrounded high voltage electrical system and comprising:
   control means including a switch in said system for establishing whether high voltage power exists therein or not, said control means having an input and requiring the supply of electrical power at said input before said switch can be closed to cause high voltage power to exist in said system;
   means including a ground fault interrupter and two wires connecting the interrupter to said input for supplying said electrical power to said input, one of said wires being connected to ground through the interrupter; and
   means including a rectifier connecting the other of said two wires to said system;
   whereby if some portion of said system accidentally becomes grounded and therefore the system presents a shock hazard, said grounding provides a drain to ground from the interrupter through said last mentioned connection and thereby causes said interrupter to disconnect said control means from its supply of electrical power with the result that said switch will be open.

* * * * *